(12) United States Patent
Hayashi

(10) Patent No.: US 6,326,937 B1
(45) Date of Patent: Dec. 4, 2001

(54) PLASMA ADDRESSED DISPLAY DEVICE

(75) Inventor: Masatake Hayashi, Gifu (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/250,492

(22) Filed: Feb. 16, 1999

(30) Foreign Application Priority Data

Feb. 20, 1998 (JP) .................................................. 10-056207

(51) Int. Cl.⁷ .............................. G09G 3/28; G09G 3/36
(52) U.S. Cl. ........................ 345/60; 345/87; 345/209; 313/582; 313/584; 349/32; 315/169.4
(58) Field of Search .................. 345/60, 87, 96, 345/209, 63; 313/484, 491, 494, 581, 585, 582–583, 584, 586; 349/32, 122; 315/169.1, 169.3, 169.4

(56) References Cited

U.S. PATENT DOCUMENTS

| 5,570,104 | * | 10/1996 | Hayashi | .................................. | 345/60 |
| 6,002,382 | * | 12/1999 | Hayashi et al. | ........................ | 345/60 |

FOREIGN PATENT DOCUMENTS

| 0 500 084 A2 | 8/1992 | (EP) . |
| 04-265933 | 9/1992 | (JP) . |
| 05-297363 | 11/1993 | (JP) . |
| 08-305324 | 11/1996 | (JP) . |

OTHER PUBLICATIONS

M. Hayashi, et al., "23.2: Development of 25–in. Plasma–Addressed LCD for Multimedia Applications", SID, Int. Symp. Digest of Tech. Papers, vol. 28, pp. 383–386, May 1997.

* cited by examiner

Primary Examiner—Richard Hjerpe
Assistant Examiner—Francis Nguyen
(74) Attorney, Agent, or Firm—Sonnenschein, Nath & Rosenthal

(57) ABSTRACT

Disclosed is a plasma addressed display device characterized in that a plurality of scanning electrodes are formed in each discharge channel, wherein discharge is generated by applying selective pulses in sequence to the plurality of scanning electrodes allocated to each discharge channel, whereby each of the number of the scanning electrodes and the number of partition walls can be reduced in at least half to thereby enhance the opening ratio, as compared with a related art plasma addressed display device.

4 Claims, 5 Drawing Sheets

PLASMA ADDRESSED DISPLAY DEVICE

RELATED APPLICATION DATA

The present application claims priority to Japanese Application No. P10 056207 filed Feb. 20, 1998 which application is incorporated herein by reference to the extent permitted by law.

BACKGROUND OF THE INVENTION

The present invention relates to a plasma addressed display device including a flat panel having a display cell and plasma cell stacked to each and peripheral circuits, and particularly to a technique of enhancing the resolution of scanning lines formed on the plasma cell.

FIG. 1 shows the structure of a plasma addressed display device disclosed in Japanese Patent Laid-open No. Hei 4-265931. As shown in FIG. 1, the plasma addressed display device has a flat panel structure including a display cell 1, a plasma cell 2, and a common intermediate sheet 3 interposed therebetween. The intermediate sheet 3 is typically formed of an extremely thin glass sheet and is called a micro-sheet. The plasma cell 2 includes a lower glass substrate 4 joined to the intermediate sheet 3. A dischargeable gas is enclosed in a gap formed between the plasma cell 2 and the intermediate sheet 3. Stripe-shaped scanning electrodes are formed on the inner surface of the lower glass substrate 4.

These scanning electrodes function as pairs of anodes A and cathodes K. The scanning electrodes can be formed with good productivity and workability by printing a pattern of the scanning electrodes on the flat glass substrate 4 using a screen printing process or the like and burning the pattern. Partition walls 7 are formed on the glass substrate 4 in such a manner as to partition each pair of the anode A and cathode K from the adjacent one, that is, to partition the gap filled with the dischargeable gas into the discharge channels 5. The adjacent discharge channels 5 are separated from each other with the partition wall 7. The partition walls 7 can be also formed by printing a pattern of the partition walls 7 using the screen printing process and burning the pattern. The tops of the partition walls 7 are in contact with the one surface side of the intermediate sheet 3. In the discharge channel 5 surrounded by the pair of partition walls 7, plasma discharge is generated between the anode A and cathode K. The intermediate sheet 3 is joined to the lower glass substrate 4 with glass frit or the like.

The display cell 1 includes a transparent upper glass substrate 8. The glass substrate 8 is bonded to the other surface side of the intermediate sheet 3 with a specific gap put therebetween by means of a sealing material or the like. A liquid crystal 9 as an electro-optical material configured is enclosed in the above gap. Signal electrodes Y are formed on the inner surface of the upper glass substrate 8. A matrix of pixels are formed at intersections of the signal electrodes Y and the discharge channels 5. A color filter 13 is provided on the inner surface of the glass substrate 8, to typically allocate three primary colors, R (Red), G (Green), and B (Blue) to each set of three pieces of the pixels. The flat panel having such a configuration is of a transmission type in which, for example, the plasma cell 2 is located on the light incoming side and the display cell 1 is located on the light outgoing side. A backlight 12 is mounted to the plasma cell 2 side.

The plasma addressed display device having the above configuration carries out the display drive by switchingly scanning, in line-sequence, rows of the discharge channels 5 for performing plasma discharge, and applying image data to columns of the signal electrodes Y on the display cell 1 side in synchronization with the scanning. When the plasma discharge is generated in each discharge channel 5, the potential of the inside of the discharge channel 5 nearly uniformly becomes an anode potential, to thereby effect pixel selection for each scanning line. That is to say, one discharge channel 5 corresponds to one scanning line, and it functions as a sampling witch. When an image data is applied to each pixel in the state in which the plasma sampling switch is made conductive, the image data is sampled, to thereby control turn-on or turn-off of the pixel. Even after the plasma sampling switch is made non-conductive, the image data is left held in the pixel. In this way, the display cell 1 carries out the image display by modulating incoming light from the backlight 12 in accordance with the image data and allowing the light thus modulated to go out of the display cell 1.

FIG. 2 is a typical view showing only a portion of two pixels of the plasma addressed display device, in which only two signal electrodes Y1 and Y2, one cathode K1, and one anode A1 are shown for an easy understanding. Each pixel 11 has a stacked structure having the signal electrode Y1 (or Y2), liquid crystal 9, intermediate sheet 3 and discharge channel. The discharge channel is substantially connected to the anode potential during the plasma discharge. When an image data is applied to each of the signal electrodes Y1 and Y2 in such a state, electric charges are injected in the liquid crystal 9 and the intermediate sheet 3. After completion of the plasma discharge, the potential of the discharge channel becomes a floating potential because the discharge channel is returned into the insulating state, with a result that the injected electric charges are held in the pixel 11. The so-called "sampling hold" is thus performed. Accordingly, the discharge channel functions as sampling switch elements provided in respective pixels 11, and therefore, it is typically designated by switching symbols S1. Meanwhile, the liquid crystal 9 and intermediate sheet 3 held between the signal electrode Y1 (or Y2) and the discharge channel function as a sampling capacitor. When the sampling switch S1 is made conductive by scanning in line-sequence, an image data is written in the sampling capacitor, to turn on or turn off the associated pixel in accordance with the level of the data voltage. Even after the sampling switch S1 is made non-conductive, the data voltage is left held in the sampling capacitor, thereby performing the active matrix operation of the display device. An effective voltage actually applied to the liquid crystal 9 is determined on the basis of the capacity-division between the liquid crystal 9 and the intermediate sheet 3.

In the plasma addressed display device having the above configuration, for the purpose of enhancing the resolution, it is required to increase the density of pixels arranged in a matrix. To make fine the pixels in the horizontal direction (row direction), the line width of each of signal electrodes arranged in columns may be made thin. To make fine the pixels in the vertical direction (column direction), the arrangement pitch of rows of discharge channels may be made short. However, each discharge channel is separated from the adjacent one by a partition wall. From the viewpoint of the processing technique, it is difficult to make extremely thin the thickness of the partition wall, and the minimum thickness of the partition wall for ensuring the necessary mechanical strength is determined. Accordingly, if the arrangement pitch of the discharge channels is made short, an area occupied by the thicknesses of the partition walls is relatively enlarged. This gives rise to a problem in sacrificing the opening area through which light actually passes. In other words, as the number of the discharge channels, that is, the scanning lines becomes larger, the opening ratio of the panel becomes lower. Incidentally, the partition wall, which is relatively high, blocks obliquely incident light rays. Accordingly, as the arrangement pitch of the partition walls becomes shorter, the blocked amount of obliquely incident light rays becomes larger. This gives rise to a problem in making narrow the viewing angle on the observer side.

In accordance with the related art, as described above, the achievement of the high-precision plasma addressed display device results in the reduction in opening ratio because of limitations in process of forming partition walls and scanning electrodes. This leads to inadequate brightness of the display. And, if the light emission amount of a backlight is made larger to compensate for the inadequate brightness of the display, the power consumption of the backlight is increased. Also, it is difficult to finely form partition walls and an electrode structure without increasing the occurrence ratio of defects. That is to say, it is difficult to make compatible the productivity of the display with the opening ratio thereof. For example, in the structure of a plasma cell shown in FIG. 3, a discharge channel 5 is formed at an arrangement pitch P of 1,000 $\mu$m. The width of a partition wall 7 is 200 $\mu$m, and the width of each of an anode A and a cathode K is 200 $\mu$m. Accordingly, the opening ratio of the panel shown in FIG. 3 becomes 40% on the basis of the calculation of [1−(200+200+200)/1000=0.4]. If the arrangement pitch P of 1,000 $\mu$m is made fine into 700 $\mu$m, the opening ratio is reduced to 14% on the basis of the calculation of [1−(200+200+200)/700=0.4. In this case, if the electrode width of each of the anode A and cathode K is made thin, the opening ratio can be made high to some extent. The narrowing of the electrode width, however, may cause disconnection and the like, giving rise to problems in lowering the manufacturing yield and significantly reducing the productivity.

SUMMARY OF THE INVENTION

An object of the present invention is to provide a plasma addressed display device in which a plurality of scanning lines in one discharge channel.

To achieve the above object, according to the present invention, there is provided a plasma addressed display device which basically includes a flat panel, a scanning circuit and a signal circuit. The flat panel has a stacked structure in which a plasma cell having rows of scanning electrodes and a display cell having columns of signal electrodes are stacked to each other. The scanning circuit scans the display cell by applying selective pulses to the scanning electrodes in sequence. The signal circuit supplies image data to the signal electrodes in synchronization with the scanning, to write the image data for each scanning line. The plasma cell has rows of discharge channels separated from each other. Each discharge channel is filled with a dischargeable gas, to which channel a plurality of scanning electrodes are allocated. In such a display device, the scanning circuit applies selective pulses in sequence to the plurality of scanning electrodes allocated to each discharge channel to generate discharge, to form a plurality of scanning lines in each discharge channel.

The signal circuit preferably performs AC drive of the display cell by writing a plurality of pieces of image data having the same polarity on the plurality of scanning lines in each discharge channel, respectively, and writing a plurality of pieces of image data having the reversed polarity to the plurality of scanning lines in the adjacent discharge channel, respectively.

In a preferred embodiment, the discharge channel includes a pair of partition walls for forming a row of space, scanning electrodes disposed on the undersides of the pair of partition walls, and a central scanning electrode disposed in the space at an intermediate position between the scanning electrodes on both the sides. One scanning line is specified between the scanning electrode disposed on the underside of the partition wall located on one side of the space and the central scanning electrode, and the other scanning line is specified between the scanning electrode disposed on the underside of the partition wall located on the other side of the space and the central scanning electrode. In this case, preferably, the scanning circuit applies a selective pulse to the central scanning electrode for generating discharge substantially in front and rear halves of the discharge channel, and applying a selective pulse to the scanning electrode disposed on the underside of the partition wall on the other side of the space to overlappingly generate discharge substantially in the rear half of the discharge channel, to form two scanning lines in one discharge channel by combination of the new discharge in the rear half of the discharge channel and the previous discharge in the front half of the discharge channel.

According to the plasma addressed display device of the present invention, the display cell is driven via at least two scanning lines formed in each of the discharge channels separated from each other. As compared with the related art structure, the density of the scanning lines becomes at least twice, so that the degree of high-precision of pixels can be correspondingly enhanced. In other words, in the case where the density of the pixels in the structure of the present invention is identical to that in the related art structure, the arrangement pitch of the discharge channel can be made at least twice that in the related art structure. This makes it possible to improve the productivity and to increase the opening ratio. Also, according to the present invention, by allocating for example, two pieces of the scanning lines to one discharge channel, two scanning lines can be formed in one discharge channel. On the contrary, in the related art plasma cell, scanning electrodes composed of a pair of an anode and a cathode are allocated to one discharge channel, to form one scanning line in one discharge channel. As a result, if the number of scanning lines in the display cell of the present invention is identical to that in the related art plasma cell, the number of scanning electrodes in the display cell of the present invention can be reduced to a half of that in the related art display cell, and therefore, the productivity and opening ratio of the display device of the present invention can be improved as compared with the related art display device.

DESCRIPTION OF THE PREFERRED EMBODIMENTS

Hereinafter, embodiments of the present invention will be described with reference to the accompanying drawings.

Figure 4A:
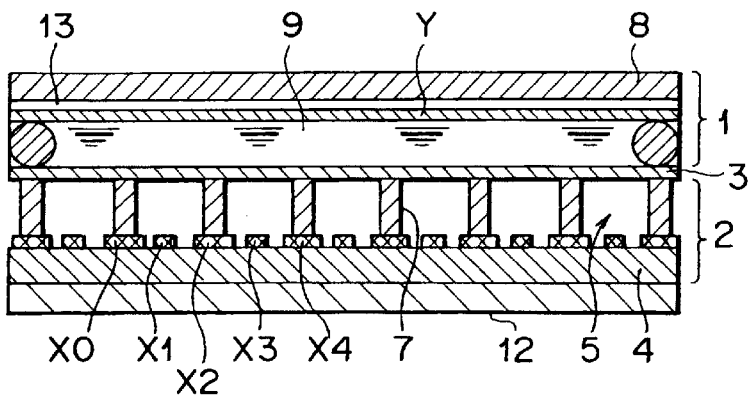
FIG. 4A is a sectional view showing a plasma addressed display device of the present invention.
Figure 4B:
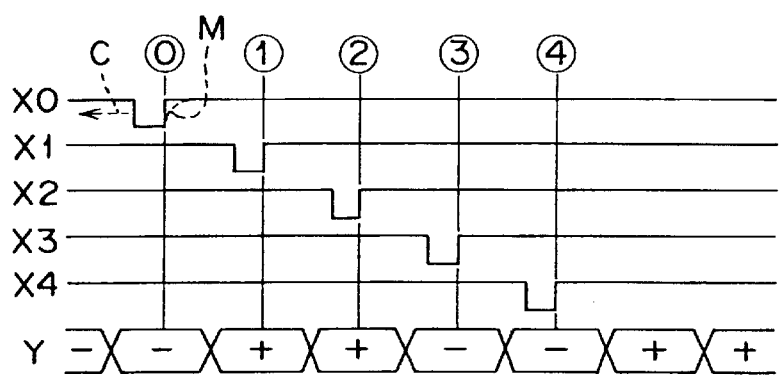
FIG. 4B is a timing chart showing the operation of the plasma addressed display device of the present invention.
Figure 4C:
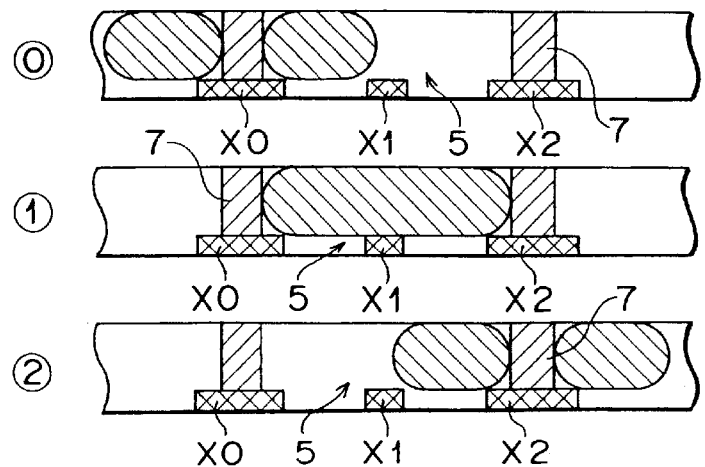
FIG. 4C is a view illustrating the operation of the plasma addressed display device of the present invention.

FIGS. 4A, 4B and 4C are typical views showing one embodiment of a plasma addressed display device of the present invention, wherein FIG. 4A is a sectional view showing the configuration of the display device; FIG. 4B is a timing chart showing the operation of the display device; and FIG. 4C is a view illustrating the operation of the display device. The plasma addressed display device of the present invention basically includes a flat panel and peripheral scanning circuits and signal circuits. FIG. 4A shows the structure of the flat panel, in which a display cell 1 and a plasma cell 2 are stacked to each other with a common intermediate sheet 3 interposed therebetween. The plasma cell 2 includes a lower glass substrate 4 joined to the intermediate sheet 3. A dischargeable gas (for example, xenon gas or neon gas) is enclosed in a gap between the plasma cell 2 and the intermediate sheet 3. Stripe-shaped scanning electrodes, which are generally designated by symbol X, are formed on the inner surface of the lower glass substrate 4. The scanning electrodes X can be formed with good productivity and workability by printing a pattern of the scanning electrodes X on the flat glass substrate 4 using a screen printing process or the like and burning the pattern. The scanning electrodes X are alternately different in width. Of the scanning electrodes X, those each having a wider width are designated by symbols X0, X2, X4, . . . , and those each having a narrower width are designated by symbols X1, X3, . . . , as shown in the figures. Partition walls 7 are respectively formed on the wider scanning electrodes X0, X2, X4, . . . , to partition the gap filled with the dischargeable gas into discharge channels 5. The partition walls 7 can be also formed by printing a pattern of the partition walls 7 by the screen printing process and burning the pattern. The tops of the partition walls 7 are in contact with one surface side of the intermediate sheet 3. As shown in FIG. 4A, the adjacent discharge channels 5 are separated from each other by the partition wall 7. With this configuration, two pieces of the scanning electrodes X are allocated to one discharge channel 5. For example, the scanning electrodes X1 and X2 are allocated to one discharge channel 5, and the scanning electrodes X3 and X4 are allocated to the adjacent discharge channel 5.

The display cell 1 includes a transparent upper glass substrate 8. The glass substrate 8 is bonded to the other surface side of the intermediate sheet 3 with a specific gap put therebetween by means of a sealing material or the like. A liquid crystal 9 as an electro-optical material configured is enclosed in the above gap. Signal electrodes Y are formed on the inner surface of the upper glass substrate 8. A matrix of pixels are arranged at intersections of the signal electrodes Y and discharge channels 5. A color filter 13 is also provided on the inner surface of the glass substrate 8 to allocate, for example, three primary colors (R, G and B) to each set of three pieces of the pixels. The flat panel having the above configuration is of a transmission type in which, for example, the plasma cell 2 is located on the light incoming side and the display cell 1 is located on the light outgoing side. A backlight 12 is mounted on the plasma cell 2 side.

As shown in FIG. 4B, the peripheral scanning circuit applies selective pulses to the scanning electrodes X0, X1, X2, X3, X4, . . . , in sequence. Each selective pulse is negative with respect to the ground potential. In the example shown FIG. 4B, the selective pulse is applied to the scanning electrode X0 with a 0-th timing; the selective pulse is applied to the scanning electrode X1 with a first timing; the selective pulse is applied to the scanning electrode X2 with a second timing; the selective pulse is applied to the scanning electrode X3 with a third timing; and the selective pulse is applied to the scanning electrode X4 with a fourth timing. After that, the selective pulses are similarly applied to the remaining scanning electrodes X in sequence. On the other hand, the peripheral signal circuit supplies image data to all of the signal electrodes Y in synchronization with the scanning circuit. In the example shown in FIG. 4B, a negative image data is supplied with the 0-th timing; a positive image data is supplied with each of the first and second timings; and a negative image data is supplied with each of the third and fourth timings. After that, an image data is similarly applied to the signal electrodes Y with each of fifth and later timings.

At the 0-th timing, when the selective pulse applied to the scanning electrode X0 is returned into the ground level, the negative image data supplied to the signal electrodes Y is sampled to be written in the pixels in each scanning line. In the actual operation, however, the writing of data is not performed simultaneously with application of the selective pulse, that is, there appears a decay designated by symbol M due to the effect of metastable particles and the like contained in plasma. The writing of data is also performed even in the decay portion. In other words, the written amount of data can be adjusted by making use of such a decay portion. For example, as shown by an arrow C, the written amount or writing range of data can be adjusted by relatively moving the phase of the selective pulse in advance of the image data. Then, at the first timing, when the selective pulse applied to the scanning electrode X1 is returned into the ground level, the positive image data applied to the signal electrodes Y is sampled. After that, the image data is similarly sampled with each of the second and later timings.

FIG. 4C is a typical view showing changes in discharge channel at the 0-th, first, and second timings with elapsed time. First, at the 0-th timing, the selective pulse is applied to the scanning electrode X0 disposed on the underside of the partition wall 7 located on one side (left side in FIG. 4C). As a result, plasma discharge is generated between a pair of the scanning electrodes, each having the ground level, located on both the sides of the scanning electrode X0. In FIG. 4C, the plasma discharge is expressed by hatching. With respect to the discharge channel 5 located at the central position in the figure, the left half of the discharge channel 5 becomes the anode potential by the plasma discharge, to form one scanning line. The negative image data is written on the pixels on the scanning line. However, the negative image data should be allocated not to the central discharge channel 5 but to the discharge region located leftward therefrom.

At the first timing, the selective pulse is applied to the central scanning electrode X1, and plasma discharge is generated between the scanning electrodes X0 and X2 located on both the sides of the scanning electrode X1. As a result, two scanning lines are formed, in each of which scanning lines the positive image data is written. That is to say, at the first timing, the negative image data having been written on the first scanning line with the 0-th timing is immediately re-written with the positive image data. The positive image data is that originally allocated to the first scanning line.

At the second timing, the selective pulse is applied to the scanning electrode X2, and plasma discharge is generated between the scanning electrodes located on both the sides of the scanning electrode X2. With respect to the central discharge channel 5, the plasma discharge is generated between the scanning electrodes X1 and X2, to form a second scanning line. The next positive image data is written in the second scanning line. That is to say, the positive image data having been written in the second scanning line with the first timing is re-written with the original positive image data with the second timing.

When the selective pulse is applied to the central scanning electrode X1, the plasma discharge is spread over the discharge channel 5, while when the selective pulse is applied to each of the scanning electrodes X0 and X2, the plasma discharge is generated substantially in a half of the discharge channel 5. As a result, the image data having been written on the first scanning line with the first timing is held as it is even when the discharge plasma is generated with the second timing, while the image data having been written on the second scanning line is re-written with the original image data with the second timing.

As is apparent from the above description, the two pieces of the image data having the same polarity are written on the two scanning lines in the same discharge channel, respectively. For example, the two pieces of positive image data are written on the right and left scanning lines in the central discharge channel, respectively. On the other hand, the two pieces of negative (reversed polarity) image data are written in the right and left scanning lines in the adjacent discharge channel, respectively. In addition, the present invention is not limited thereto, and two pieces of image data having the reversed polarities may be of course written in the right and left scanning lines in the same discharge channel, respectively. In this case, however, since there exists a boundary through which the polarity is shifted from positive to negative in the liquid crystal of the display cell, there may occur a problem associated with transmittance at the boundary.

Figure 1:
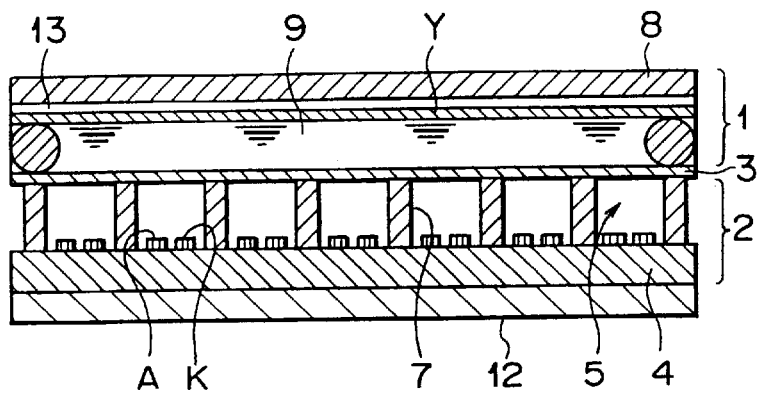
FIG. 1 is a sectional view showing a related art plasma addressed display device.
Figure 5A:
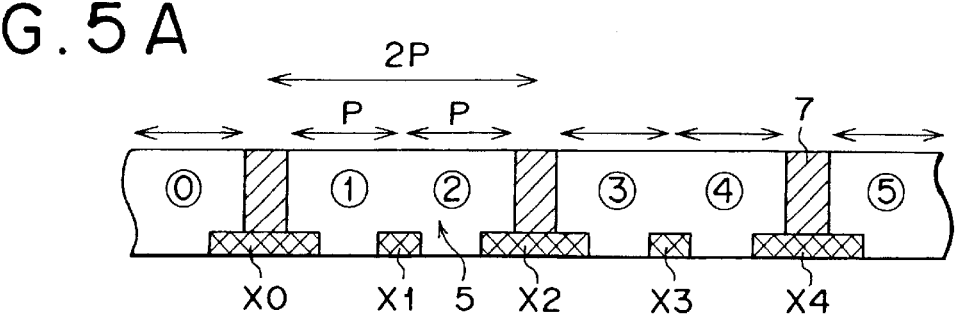
FIG. 5A is a view illustrating the image data writing operation of the plasma addressed display device of the present invention.
Figure 5B:
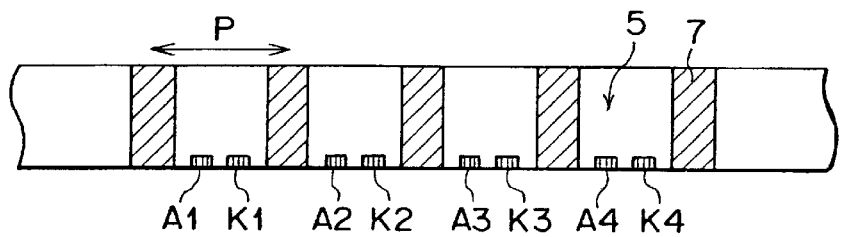
FIG. 5B is a view illustrating the image data writing operation of the related art plasma addressed display device.

FIGS. 5A and 5B are typical views illustrating the results of writing image data, wherein FIG. 5A shows the results obtained in the case of using the display device of the present invention, and FIG. 5B shows the results obtained in the case of using the related art display device shown in FIG. 1. As shown in FIG. 5A, in the discharge channel 5 to which the scanning electrodes X1 and X2 are allocated, a first image data is written on a first scanning line and a second image data is written on a second scanning line. The first and second image data are both positive. The arrangement pitch of one scanning line is designated by symbol P. Since one discharge channel 5 has the two scanning lines, the arrangement pitch of the discharge channel 5 becomes 2P. In the adjacent discharge channel 5 to which the scanning electrodes X3 and X4 are allocated, a third image data is written on a first scanning line and a fourth image data is written on a second scanning line. The third and fourth image data are both negative. After that, similarly, two pieces of image data are respectively written on two scanning lines for each of the subsequent discharge channels 5. Incidentally, it may be desirable to write the first and second image data in the discharge channel 5 in such a manner that the boundary between both the image data be controlled to be matched with the position of the central scanning electrode X1 as accurately as possible. As described with reference to FIG. 4B, the boundary between the first and second image data can be moved to the optimum position by adjusting the phase relationship between the selective pulse and image data. Alternatively, the boundary between both the image data can be moved to the optimum position by adjusting the discharge current and the pressure of the dischargeable gas.

Meanwhile, as shown in FIG. 5B, in the related art display device, one scanning line is allocated to one discharge channel 5. The one scanning line is composed of a pair of the anode A and cathode K. If the density of the scanning lines of the related art display device is identical to that of the display device of the present invention, the arrangement pitch P of the discharge channel 5 in the related art display device becomes half that in the display device of the present invention. As is apparent from comparison between FIGS. 5A and 5B, each of the number of the partition walls 7 and the number of the scanning electrodes in the display device of the present invention can be made half that in the related art display device. As a result, according to the display device of the present invention, it is possible to improve the productivity and increase the opening ratio as compared with the related art display device. Incidentally, the number of the partition walls 7 may be made as small as possible because the partition walls 7 block the viewing angle. In this regard, according to the structure of the present invention shown in FIG. 5A, since the number of the partition walls 7 is reduced to a half of that in the related art structure shown in FIG. 5B, the viewing angle of the screen can be correspondingly extended.

Figure 6:
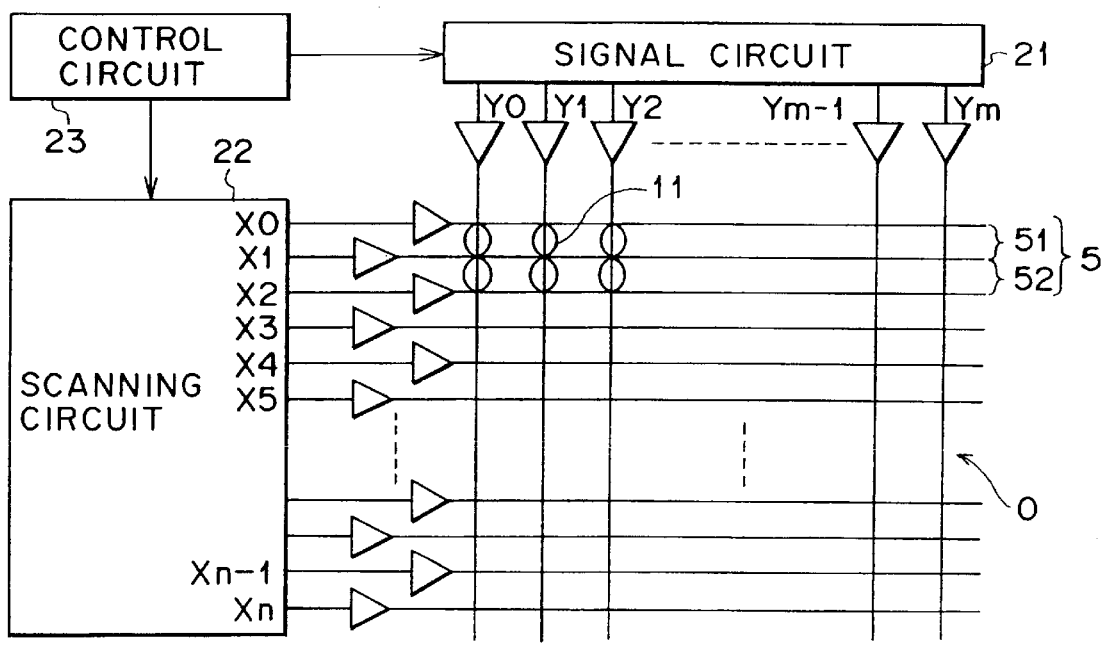
FIG. 6 is a circuit diagram showing the entire configuration of the plasma addressed display device of the present invention.

FIG. 6 is a typical circuit diagram showing the entire configuration of the plasma addressed display device of the present invention. As shown in FIG. 6, the plasma addressed display device basically includes a panel 0, a signal circuit 21, a scanning circuit 22, and a control circuit 23. The panel 0 has a stacked structure in which a plasma cell having rows of scanning electrodes X0 to Xn and a display cell having columns of signal electrodes Y0 to Ym are stacked to each other. The scanning circuit 22 scans the display cell by applying selective pulses in sequence to the scanning electrodes X0 to Xn. The signal circuit 21 supplies image data to the signal electrodes Y0 to Ym in synchronization with the above scanning to write the image data for each of scanning lines 51 and 52. The control circuit 23 controls the signal circuit 21 and scanning circuit 22 in synchronization with each other. As described above, the plasma cell includes rows of discharge channels 5 separated from each other. Each discharge channel 5 is filled with a dischargeable gas, to which channel 5 a plurality of the scanning electrodes are allocated. The scanning circuit 22 applies selective pulses in sequence to the plurality of scanning electrodes (for example, X1 and X2) allocated to each discharge channel 5 to generate discharge, thus forming at least two scanning lines 51 and 52 in one discharge channel 5. The signal circuit 21 preferably performs AC drive of the display cell by writing a plurality of pieces of image data having the same polarity on the plurality of scanning lines (for example, 51 and 52) in one scanning line 5 respectively, and also writing a plurality of pieces of image data having the reversed polarity on the plurality of scanning lines in the adjacent discharge channel respectively.

In one specific example, the discharge channel 5 includes a pair of partition walls forming a row of space, scanning electrodes (for example, X0 and X2) disposed on the undersides of the pair of partition walls, and a central scanning electrode X1 disposed in the space at the intermediate position between both the scanning electrodes X0 and X2. One scanning line 51 is specified between the scanning electrode X1 disposed on the underside of the partition wall located on one side of the space and the central scanning electrode X1 and the other scanning line 52 is specified between the scanning electrode X2 disposed on the underside of the partition wall located on the other side of the space and the central scanning electrode X1. In this case, the scanning circuit 22 applies the selective pulse to the central scanning electrode X1 to generate discharge substantially throughout, that is, in front and rear halves of the discharge channel 5, and then applies the selective pulse to the scanning electrode X2 disposed on the underside of the partition wall on the other side of the space to generate discharge substantially in the rear half of the discharge channel 5, to form the two scanning lines 51 and 52 in one discharge channel 5 by combination of the new discharge in the rear half of the discharge channel 5 and the previous discharge in the front half of the discharge channel 5.

Figure 7:
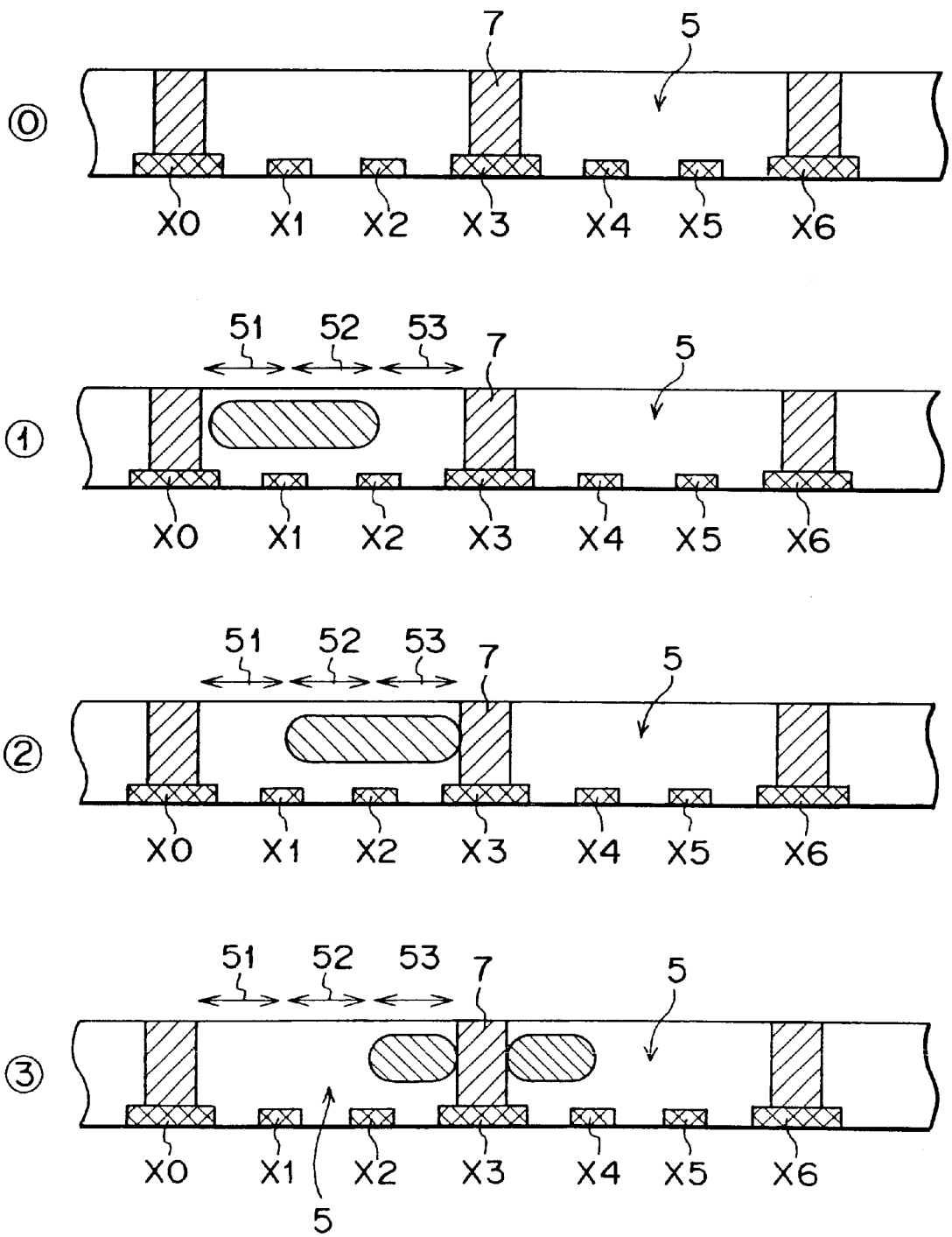
FIG. 7 is a typical view showing another embodiment of the plasma addressed display device of the present invention, in which three scanning lines are allocated to one discharge channel.

FIG. 7 is a typical view showing another embodiment of the plasma addressed display device of the present invention, in which three scanning lines are allocated to one discharge channel. As shown on the top of the figure, three scanning electrodes X1, X2 and X3 are disposed in one discharge channel 5, and similarly three scanning electrodes X4, X5 and X6 are disposed in the adjacent discharge channel 5. A selective pulse is applied to the scanning electrode X1 with a first timing. As a result, plasma discharge is generated in the first discharge channel 5 to simultaneously form two scanning lines 51 and 52. A selective pulse is applied to the scanning electrode X2 with a second timing to locally generate plasma discharge between the adjacent scanning electrodes X1 and X3, to simultaneously form two scanning lines 52 and 53. As a result, the image data having been written on the scanning line 52 with the first timing is immediately re-written with the second timing. At this time, the image data having been written on the scanning line 51 is left as the original data. A selective pulse is applied to the scanning electrode X3 with a third timing to generate plasma discharge between the adjacent scanning electrodes X2 and X4. With respect to the first discharge channel 5, the third scanning line 53 is formed again by plasma discharge. As a result, the image having been written on the scanning line 53 with the second timing is immediately re-written with the third timing. At this time, the image data having been written on the scanning line 52 is left as the original data. In this way, the three scanning lines 51, 52 and 53 are sequentially formed in one discharge channel 5, and the image data corresponding to the three scanning lines 51, 52 and 53 are written in the discharge channel 5.

Figure 8:
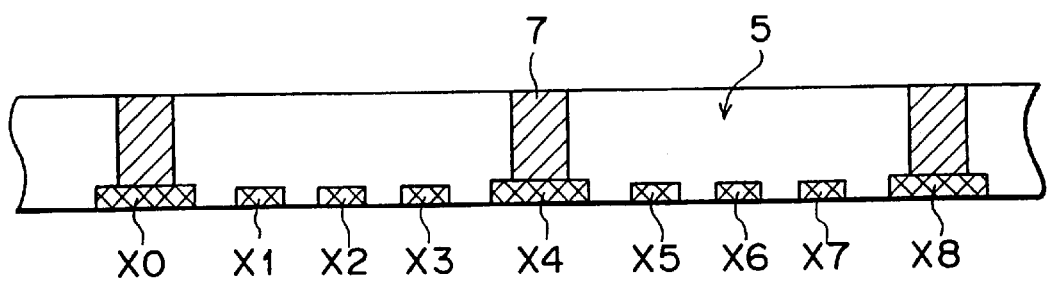
FIG. 8 is a typical view showing a further embodiment of the plasma addressed display device of the present invention, in which four scanning lines are allocated to one discharge channel.
Figure 2:
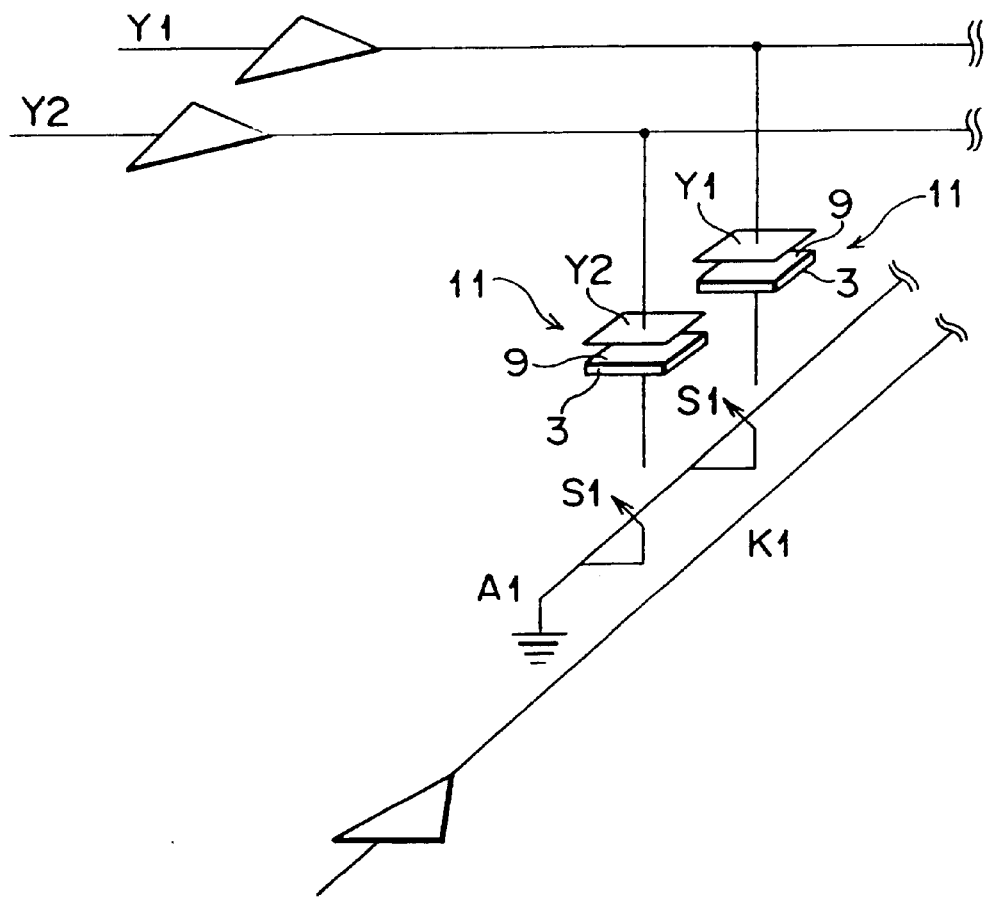
FIG. 2 is a typical view illustrating the operation of the related art plasma addressed display device.
Figure 3:
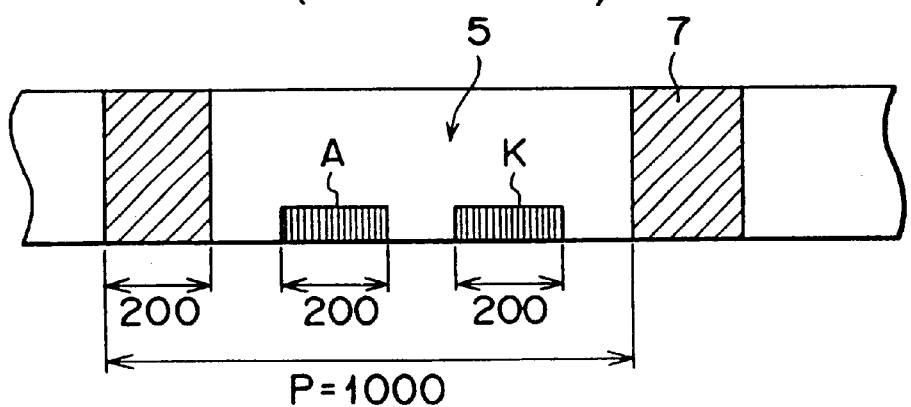
FIG. 3 is a typical view showing an electrode structure of the related art plasma addressed display device.

FIG. 8 is a partial sectional view typically showing a further embodiment of the plasma addressed display device of the present invention. In this embodiment, four scanning electrodes are allocated to one discharge channel 5. By adopting the drive method in accordance with the present invention, it is possible to write image data corresponding to the four scanning lines in one discharge channel 5.

As described above, the plasma addressed display device of the present invention is characterized in that at least two scanning lines are provided in one discharge channel. To form at least two scanning lines in one discharge channel, at least two scanning electrodes are provided in the discharge channel. With this configuration, each of the number of the scanning electrodes and the number of the partition walls can be made half that in the related art display device, to thereby significantly improve the productivity. Also, since the opening ratio is increased, the brightness of the display is enhanced and correspondingly the power consumption of the backlight can be reduced. Further, since the number of the partition walls is reduced, it is possible to moderate the limitation in viewing angle in the vertical direction on the screen, and hence to enlarge the viewing angle.

While the preferred embodiments of the present invention have been described using specific terms, such description is for illustrative purposes only, and it is to be understood that changes and variations may be made without departing from the spirit or scope of the following claims.

What is claimed is:

1. A plasma addressed display device comprising:

a flat panel in which a plasma cell having rows of scanning electrodes and a display cell having columns of signal electrodes are stacked to each other;

a scanning circuit for scanning said display cell by applying selective pulses to said scanning electrodes in sequence; and a signal circuit for supplying image data to said signal electrodes in synchronization with the scanning, thereby writing the image data for each scanning line, wherein said plasma cell has rows of discharge channels separated from each other;

each of said discharge channels is filled with a dischargeable gas, to which channel a plurality of scanning electrodes are allocated; and said scanning circuit applies selective pulses in sequence to the plurality of scanning electrodes allocated to each discharge channel to generate discharge, to form a plurality of scanning lines in each discharge channel.

2. A plasma addressed display device according to claim 1, wherein said signal circuit performs AC drive of said display cell by writing a plurality of pieces of image data having the same polarity on the plurality of scanning electrodes in each discharge channel, respectively, and writing a plurality of pieces of image data having the reversed polarity to the plurality of scanning lines in the adjacent discharge channel, respectively.

3. A plasma addressed display device according to claim 1, wherein said discharge channel includes a pair of partition walls for forming a row of space, scanning electrodes disposed on the undersides of said pair of partition walls, and a central scanning electrode disposed in said space at an intermediate position between said scanning electrodes on both the sides; and one scanning line is specified between said scanning electrode disposed on the underside of said partition wall located on one side of said space and said central scanning electrode, and the other scanning line is specified between said scanning electrode disposed on the underside of said partition wall located on the other side of said space and said central scanning electrode.

4. A plasma addressed discharge device according to claim 3, wherein said scanning circuit applies a selective pulse to said central scanning electrode for generating discharge substantially in front and rear halves of said discharge channel, and applying a selective pulse to said scanning electrode disposed on the underside of said partition wall on the other side of said space to overlappingly generate discharge substantially in the rear half of said discharge channel, to form two scanning lines in one discharge channel by combination of the new discharge in the rear half of said discharge channel and the previous discharge in the front half of said discharge channel.

* * * * *